Dec. 16, 1924.

E. SEDGWICK

NEVER SLIP TIRE CHAIN

Filed March 14, 1923

1,519,937

Inventor

Edward Sedgwick

Patented Dec. 16, 1924.

1,519,937

UNITED STATES PATENT OFFICE.

EDWARD SEDGWICK, OF ROUNDUP, MONTANA.

NEVER-SLIP TIRE CHAIN.

Application filed March 14, 1923. Serial No. 625,043.

*To all whom it may concern:*

Be it known that I, EDWARD SEDGWICK, a citizen of the United States, residing at Roundup, in the county of Musselshell and State of Montana, have invented certain new and useful Improvements in a Never-Slip Tire Chain, of which the following is a specification.

This invention relates to improvements in anti-skid chains and has particular reference to means employed for fastening the chains to a pneumatic tire.

The prime object of this invention is to provide an anti-skid chain, which after being positioned on a tire will not under any condition slip or be accidentally dislodged from said tire.

A further object of my invention is to provide an anti-skid chain of the above indicated character, which can be easily and quickly placed in position, and does not require any backward and forward movement on the part of the driver of the automobile to secure the chain in position.

A still further object of the invention is to provide a chain of the character indicated, which is simple in construction, durable, efficient for the purpose intended, and one that can be manufactured and placed on sale at a relatively low cost.

These and like objects of the invention will be better understood as the description follows and as is specifically pointed out in the appended claim.

Referring to the accompanying drawing which forms a part of this specification,

Referring to the accompanying drawing in detail, like characters will be used to designate like parts in the different views.

Figure 1:
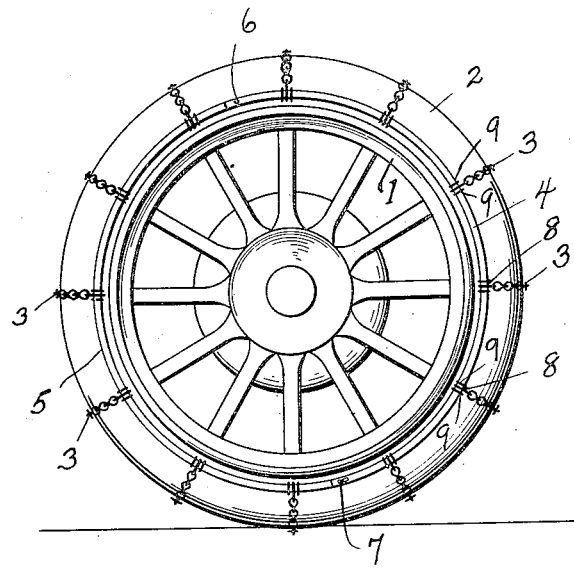
Figure 1 is a side elevation of an automobile wheel equipped with an anti-skid chain constructed in accordance with my invention.
Figure 2:
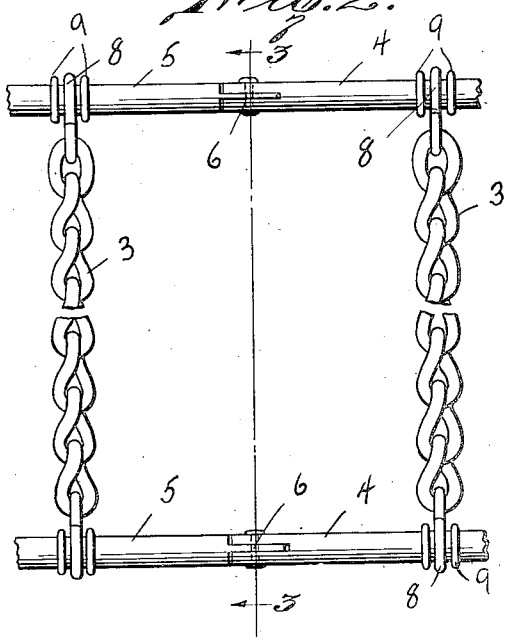
Figure 2 is an enlarged plan view of a section of an anti-skid chain constructed in accordance with my invention.
Figure 3:
Figure 3 is sectional view taken on line 3—3 of Figure 2, looking in the direction of the arrows.

In the drawing, the numeral 1 indicates an automobile wheel which is equipped with a pneumatic tire 2 of the usual construction.

My improved anti-skid chain comprises a series of cross chains 3, the opposite ends of each chain adapted to be loosely connected to a ring positioned on each side of the tire. Each of the rings are formed in two sections 4 and 5 respectively, and same are pivotally connected as at 6 and have their free ends connected directly opposite the pivotal connection 6 as at 7, said connections being formed by openings in each end of the members 4 and 5 which are adapted to align for receiving therein a cotter pin.

The cross chains 3 are loosely connected to the sections 4 and 5 as at 8 and on each side of each of the connections 8 a ring 9 is mounted stationary on the sections 4 and 5, said rings 9 being spaced a short distance from the connections 8 to permit a limited movement of said connection members on said rings, yet said cross chains 3 are prevented from sliding and riding into engagement with each other. It will thus be seen that the stationary rings 9 keep the chains spaced from each other.

When it is desired to remove the anti-skid chain from the wheel, it is only necessary to remove the cotter pins from the aligned openings in the ends of the sections 4 and 5 and by bending the sections on the pivot 6, the same as a whole is readily removed from the wheel. In placing the chain on a wheel, the operation is reverse from that described above.

In view of the foregoing description of my invention, taken in connection with the accompanying drawing, it is thought that any further explanation as to the construction, operation, and objects of same is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

An anti-skid device for automobile tires comprising a pair of rings adapted to be disposed on opposite sides of the tire. a plurality of tread chains arranged transversely of the tire, the end links of each tread chain adapted to loosely engage around said rings, and collars permanently arranged on said rings positioned a short distance on each side of said end links to permit a limited movement of said end links on said rings.

In testimony whereof, I have affixed my signature in the presence of two witnesses.

EDWARD SEDGWICK.

Witnesses:
 SIM PHILPOTT,
 LOUIS MEALNE.